(12) United States Patent
Liang et al.

(10) Patent No.: US 11,909,086 B2
(45) Date of Patent: Feb. 20, 2024

(54) DIELECTRIC FILTER, DUPLEXER, AND COMMUNICATIONS DEVICE

(71) Applicant: Huawei Technologies Co., Ltd., Shenzhen (CN)

(72) Inventors: Dan Liang, Shanghai (CN); Xiaofeng Zhang, Kista (SE); Zheng Cui, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 251 days.

(21) Appl. No.: 17/359,166

(22) Filed: Jun. 25, 2021

(65) Prior Publication Data

US 2021/0328315 A1     Oct. 21, 2021

Related U.S. Application Data

(63) Continuation of application No. PCT/CN2018/124006, filed on Dec. 26, 2018.

(51) Int. Cl.
*H01P 1/20* (2006.01)
*H01P 1/212* (2006.01)
*H01P 5/12* (2006.01)
*H04B 1/40* (2015.01)

(52) U.S. Cl.
CPC ............ *H01P 1/2002* (2013.01); *H01P 1/212* (2013.01); *H01P 5/12* (2013.01); *H04B 1/40* (2013.01)

(58) Field of Classification Search
CPC .......... H01P 1/2002; H01P 1/212; H01P 5/12; H01P 1/2136; H01P 1/2056; H04B 1/40
See application file for complete search history.

(56) References Cited

U.S. PATENT DOCUMENTS

| | | | |
|---|---|---|---|
| 4,431,977 A | 2/1984 | Sokola et al. | |
| 4,757,284 A | 7/1988 | Ueno | |
| 11,145,945 B2 * | 10/2021 | Su .......................... | H01P 1/2002 |

(Continued)

FOREIGN PATENT DOCUMENTS

| | | |
|---|---|---|
| CN | 1253392 A | 5/2000 |
| CN | 101908666 A | 12/2010 |

(Continued)

*Primary Examiner* — Andrea Lindgren Baltzell
*Assistant Examiner* — Kimberly E Glenn
(74) *Attorney, Agent, or Firm* — Leydig, Voit & Mayer, Ltd.

(57) ABSTRACT

A dielectric filter, a duplexer, and a communications device are provided. The dielectric filter includes a dielectric body, and a wideband filtering structure and a narrowband filtering structure that are disposed in the dielectric body. The wideband filtering structure includes a groove disposed on a first surface of the dielectric body and configured to adjust a frequency position of a passband of the wideband filtering structure; and at least one first resonator including a through hole penetrating the bottom of the groove and a second surface of the dielectric body; and an open loop located on a bottom surface of the groove and is disposed around an opening of the through hole. The narrowband filtering structure includes at least one second resonator including a blind hole disposed on the second surface of the dielectric body. The first surface and the second surface of the dielectric body are disposed oppositely.

20 Claims, 9 Drawing Sheets

(56) References Cited

U.S. PATENT DOCUMENTS

2002/0140530 A1   10/2002  Okada et al.
2003/0020566 A1    1/2003  Takubo et al.

FOREIGN PATENT DOCUMENTS

| | | | | |
|---|---|---|---|---|
| CN | 202259605 | U | 5/2012 | |
| CN | 102498665 | A | 6/2012 | |
| CN | 106898849 | A | 6/2017 | |
| CN | 206332149 | U | 7/2017 | |
| CN | 206532857 | U | 9/2017 | |
| CN | 206893772 | U | 1/2018 | |
| CN | 104604022 | B | 4/2018 | |
| CN | 107994304 | A | 5/2018 | |
| CN | 108832240 | A | 11/2018 | |
| CN | 112952316 | A * | 6/2021 | ............ H01P 1/2002 |
| CN | 111478009 | B * | 11/2021 | ............. H01P 1/208 |
| JP | 2005176211 | A | 6/2005 | |
| WO | 2005027535 | A2 | 3/2005 | |
| WO | WO-2021012447 | A1 * | 1/2021 | ............ H01P 1/2002 |

\* cited by examiner

DIELECTRIC FILTER, DUPLEXER, AND COMMUNICATIONS DEVICE

CROSS-REFERENCE TO RELATED APPLICATIONS

This application is a continuation of International Application No. PCT/CN2018/124006, filed on Dec. 26, 2018, the disclosure of which is hereby incorporated by reference in its entirety.

TECHNICAL FIELD

Embodiments of this application relate to communications device components, and in particular, to a dielectric filter, a duplexer, and a communications device.

BACKGROUND

To meet a development requirement of miniaturization of a communications device (for example, a small cell), a dielectric filter that is small in size and light in weight is usually used in the communications device. Compared with a conventional metallic cavity filter, the dielectric filter has a problem of a poor harmonic suppression ability. To resolve the problem, a low-pass filter cascaded with the dielectric filter is usually added. In this case, problems such as a great difficulty in matching between different filters and high layout space consumption arise.

SUMMARY

According to a first aspect of this application, a dielectric filter, a duplexer, and a communications device are provided, to resolve problems of a great difficulty in matching between different filters and high layout space consumption that are caused by addition of a low-pass filter cascaded with the dielectric filter.

To achieve the foregoing objective, the following technical solutions are used in this application.

According to an aspect of embodiments of this application, a dielectric filter is provided, including a dielectric body, where a surface of the dielectric body is covered with a conductive layer, and both a wideband filtering structure and a narrowband filtering structure are disposed in the dielectric body. A passband of the narrowband filter structure is within a passband of the wideband filtering structure. The wideband filtering structure includes a groove and at least one first resonator. The groove is disposed on a first surface of the dielectric body, and the groove is configured to adjust a frequency position of the passband of the wideband filtering structure. The first resonator includes a through hole and an open loop. The through hole penetrates the bottom of the groove and a second surface of the dielectric body, and a hole wall of the through hole is covered with the conductive layer. The open loop is located on a bottom surface of the groove and is disposed around an opening of the through hole. A side surface of the groove and a part, other than the open loop, of the bottom surface of the groove are covered with the conductive layer. The narrowband filtering structure includes at least one second resonator, and the second resonator includes a blind hole disposed on the first surface or the second surface of the dielectric body. A hole wall and a bottom surface of the blind hole are covered with the conductive layer. The first surface and the second surface of the dielectric body are disposed oppositely. In conclusion, the dielectric filter includes the wideband filtering structure and the narrowband filtering structure that are disposed in the same dielectric body. The first resonator in the wideband filtering structure can enable a far-end harmonic, that is, a harmonic that is in an input signal and that is at a frequency position farther away from a passband of the dielectric filter, to be well suppressed. The second resonator in the narrowband filtering structure can limit a frequency of an output signal to a comparatively narrow passband. After a signal passes through the foregoing dielectric filter, a far-end suppression capability can be improved for the signal, to reduce mutual interference between base stations of different frequency bands, and precision of frequency screening can also be improved for the signal, to avoid existence of an overlapping area in frequency bands of the base stations of different frequency bands. The dielectric body including the groove, the through hole, and the blind hole may be prepared by using an integrated molding process, and then a surface of the dielectric body having the foregoing structure is electroplated by using an electroplating process. The dielectric body is a continuous structure, which helps simplify a manufacturing process of the dielectric filter. Both the wideband filtering structure and the narrowband filtering structure are disposed in the same dielectric body. Therefore, in a process of commissioning the dielectric filter, the wideband filtering structure and the narrowband filtering structure may be commissioned as a whole, or a commissioning process may be avoided, so that an echo of the dielectric filter can reach a value that can meet a requirement, thereby improving matching between the two filtering structures. Further, the following problem can be avoided: After a low-pass filter cascaded with the dielectric filter is added, the two filters cannot be commissioned as a whole. In addition, an amplitude and a phase of a signal filtered by the dielectric filter superimpose on an amplitude and a phase of the signal filtered by the cascaded low-pass filter respectively, where the dielectric filter and the cascaded low-pass filter are independent of each other. A great possibility of echo deterioration caused by the superimposition can be avoided. In addition, because the wideband filtering structure and the narrowband filtering structure are disposed in the same dielectric body, the low-pass filter cascaded with the dielectric filter does not need to be disposed on a PCB on which the dielectric filter is disposed, or an extra PCB is added separately for disposing of the low-pass filter. Therefore, the problem of high layout space consumption can be resolved.

Optionally, the dielectric body includes a first dielectric block and a second dielectric block that are connected and are an integral structure, and a coupling adjustment structure located between the first dielectric block and the second dielectric block. The coupling adjustment structure is configured to adjust an amount of signal coupling between the first dielectric block and the second dielectric block. The wideband filtering structure is disposed in the first dielectric block, and the at least one second resonator in the narrowband filtering structure is disposed in the second dielectric block.

Optionally, the dielectric body includes a first dielectric block and a second dielectric block that are connected and are an integral structure, and a coupling adjustment structure located between the first dielectric block and the second dielectric block. The coupling adjustment structure is configured to adjust an amount of signal coupling between the first dielectric block and the second dielectric block. The narrowband filtering structure includes two second resonators, which are separately a first-order second resonator and a second-order second resonator that are coupled to each other. The first-order second resonator and the wideband filtering structure are located in the first dielectric block, and the first-order second resonator is located on a side that is of the wideband filtering structure and that is close to the second dielectric block. The second-order second resonator is located in the second dielectric block. The narrowband filtering structure includes the two second resonators, thereby improving a filtering effect of the narrowband filtering structure. The wideband filtering structure and the first-order second resonator in the narrowband filtering structure are disposed in the first dielectric block, so that a distance between the first-order second resonator and the wideband filtering structure can be shortened, to increase an amount of signal coupling between the wideband filtering structure and the narrowband filtering structure.

Optionally, the dielectric body includes a first side surface and a second side surface that are disposed oppositely. The coupling adjustment structure includes a first coupling blind hole disposed on the first side surface, and a second coupling blind hole disposed on the second side surface. An orthographic projection of the first coupling blind hole on the second side surface overlaps at least a part of the second coupling blind hole. Hole walls and bottom surfaces of the first coupling blind hole and the second coupling blind hole are covered with the conductive layer. In this way, by adjusting depths of the first coupling blind hole and the second coupling blind hole, that is, adjusting a distance between the bottom surfaces of the first coupling blind hole and the second coupling blind hole, an amount of signal coupling between the first resonator that is in the wideband filtering structure and that is closest to the second dielectric block and the second resonator in the second dielectric block can be adjusted.

Optionally, the wideband filtering structure includes two first resonators, which are separately a first-order first resonator and a second-order first resonator that are coupled to each other. The second-order first resonator is located between the first-order first resonator and the narrowband filtering structure. The wideband filtering structure includes the two first resonators, thereby improving a filtering effect of the wideband filtering structure.

Optionally, the wideband filtering structure further includes at least one adjustment through hole. A hole wall of the adjustment through hole is covered with the conductive layer. The adjustment through hole penetrates the bottom of the groove and the second surface of the dielectric body. The adjustment through hole is configured to adjust a harmonic suppression capability of the dielectric filter. Density of a plurality of adjustment through holes is proportional to the harmonic suppression capability of the dielectric filter. The density of the plurality of adjustment through holes may be adjusted to achieve an objective of adjusting the harmonic suppression capability of the dielectric filter.

Optionally, to simplify a manufacturing process, the plurality of adjustment through holes are arranged in a matrix form, and are evenly distributed at a position where the groove is located.

Optionally, the wideband filtering structure further includes a first signal hole and a second signal hole. The first signal hole is configured to input a signal, and the second signal hole is configured to output a signal. Alternatively, the second signal hole is configured to input a signal, and the first signal hole is configured to output a signal. The wideband filtering structure and the narrowband filtering structure are located between the first signal hole and the second signal hole. The first signal hole and the second signal hole are configured to connect to a probe of an input electrical connection and a probe of an output connector respectively.

Optionally, the wideband filtering structure further includes a third coupling blind hole. A hole wall and a bottom surface of the third coupling blind hole are covered with the conductive layer. Optionally, the third coupling blind hole is located on a side surface of the groove, penetrates the groove, and is connected to one end of the first signal hole. A pore size of the third coupling blind hole is greater than a pore size of the first signal hole. The third coupling blind hole is configured to adjust an amount of signal coupling between the first signal hole and the wideband filtering structure.

According to a second aspect of this application, a duplexer is provided, including a transmitter filter and a receiver filter. The transmitter filter and/or the receiver filter are/is any one of the foregoing dielectric filters. Technical effects of the duplexer are the same as those of the dielectric filters provided in the foregoing embodiments, and details are not described herein again.

According to a third aspect of this application, a communications device is provided, including the foregoing duplexer. Technical effects of the communications device are the same as those of the dielectric filters in the duplexer provided in the foregoing embodiment, and details are not described herein again.

REFERENCE SIGNS IN THE ACCOMPANYING DRAWINGS

01: dielectric filter; 100: transmitter filter; 110: receiver filter; 120: transmitter circuit; 130: receiver circuit; 10:

dielectric body; 101: first dielectric block; 102: second dielectric block; 11: conductive layer; 20: wideband filtering structure; 201: groove; 202: first resonator; 202a: first-order first resonator; 202b: second-order first resonator; 212: through hole; 222: open loop; 203: third coupling blind hole; 204: adjustment through hole; 30: narrowband filtering structure; 301: second resonator; 301a: first-order second resonator; 301b: second-order second resonator; 40: first signal hole; 41: second signal hole; 50: input connector; 51: output connector; 600: coupling adjustment structure; 60: first coupling blind hole; 61: second coupling blind hole

DESCRIPTION OF EMBODIMENTS

The following describes the technical solutions in the embodiments of this application with reference to the accompanying drawings in the embodiments of this application. It is clearly that, the described embodiments are merely a part rather than all of the embodiments of this application.

The following terms "first" and "second" are merely intended for a purpose of description, and shall not be understood as an indication or implication of relative importance or implicit indication of the number of indicated technical features. Therefore, a feature limited by "first" or "second" may explicitly or implicitly include one or more features. In the description of the present invention, unless otherwise stated, "a plurality of" means two or more than two.

In addition, in this application, position terms such as "upper", "lower", "front", and "rear" are defined relative to positions in which components in the accompanying drawings are schematically placed. It should be understood that these position terms are relative concepts, are used for description and clarification of "relative to", and may vary according to a change in the positions in which the components in the accompanying drawings are placed.

In a wireless communications system, a radio frequency front end of a base station that serves as a communications device includes a filter, so that a receive signal of an antenna is filtered by using the filter and then transmitted to a next receiver circuit, to suppress an impact of a received out-of-band spurious system signal on the next circuit; or a transmit signal from a next transmitter circuit is filtered by using the filter and then sent by using an antenna, to prevent an out-of-band spurious system signal from entering the antenna for sending.

Figure 1:
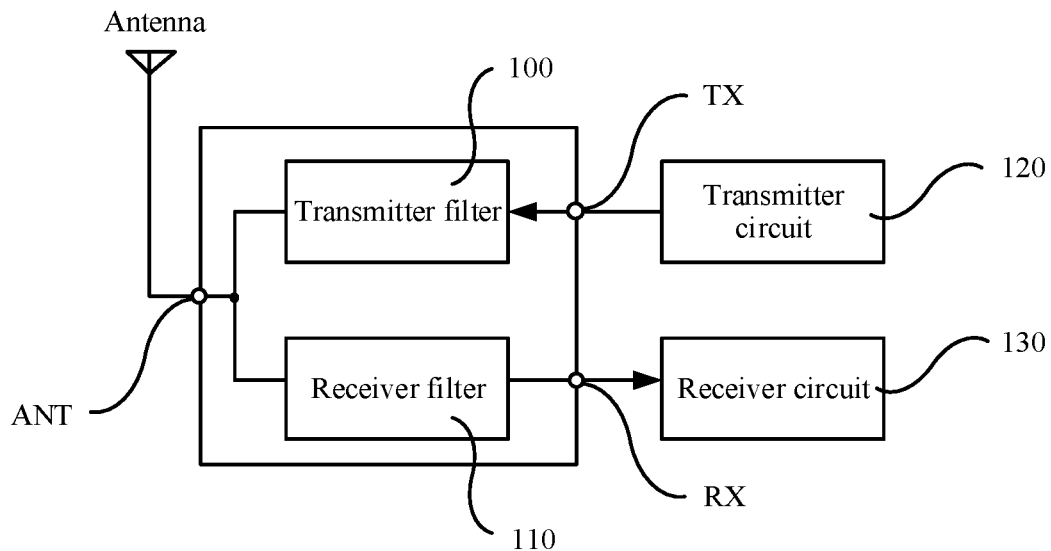
FIG. 1 is a schematic diagram of a partial structure of a communications device according to some embodiments of this application.

An embodiment of this application provides a communications device. The communications device may be a small cell, or may be another type of communications device, for example, various types of terminals or user equipment. The communications device includes an antenna and a duplexer. As shown in FIG. 1, the duplexer includes a transmitter filter 100, a receiver filter 110, a transmitter circuit 120, and a receiver circuit 130.

The transmitter filter 100 and the receiver filter 110 are connected to the antenna by using an antenna port (antenna hardware interface, ANT).

The transmitter filter 100 receives, by using a transmit-signal input interface (Tx), a transmit signal from the transmitter circuit 120. The receiver filter 110 sends a receive signal to the receiver circuit 130 by using a receive-signal output interface (Rx).

The transmitter filter 100 and/or the receiver filter 110 may be a dielectric filter provided in an embodiment of this application, and filtering is implemented by using a function of signal coupling and transmission between resonators in the dielectric filter.

Certainly, the duplexer and the communications device including the duplexer are merely examples, and are not the only scenario in which the dielectric filter provided in this embodiment of this application can be applied.

Figure 2:
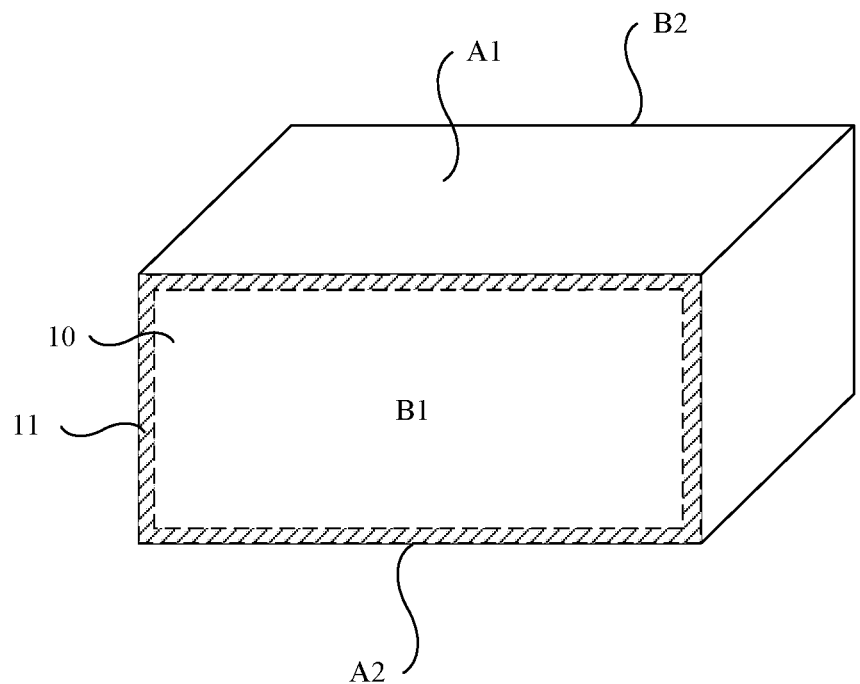
FIG. 2 is a schematic structural diagram of a dielectric body in a transmitter filter or a receiver filter in FIG. 1.

Based on the foregoing principle, an embodiment of this application provides a dielectric filter. The dielectric filter includes a dielectric body 10, as shown in FIG. 2.

A material constituting the dielectric body 10 includes a solid dielectric material, for example, an insulating material such as ceramic or a high polymer.

A surface of the dielectric body 10 is covered with a conductive layer 11. A material constituting the conductive layer 11 may be a metal material, for example, silver. The conductive layer may be formed by electroplating a metal on the surface of the dielectric body 10 by using an electroplating process.

It should be noted that, for convenience of the following example description, in this embodiment of this application, an upper surface and a lower surface of the dielectric body 10 that are opposite to each other are referred to as a first surface A1 and a second surface A2 respectively; and a front surface and a rear surface of the dielectric body 10 that are opposite to each other are referred to as a first side surface B1 and a second side surface B2 respectively.

Figure 3:
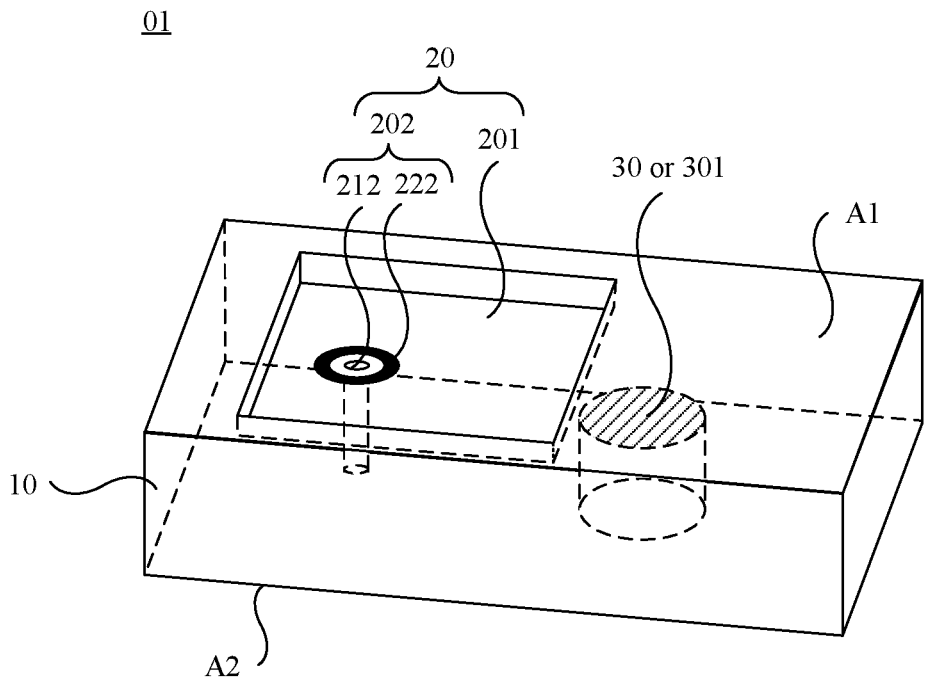
FIG. 3 is a schematic structural diagram of the transmitter filter or the receiver filter in FIG. 1.

As shown in FIG. 3, the dielectric filter 01 further includes a wideband filtering structure 20 and a narrowband filtering structure 30. Both the wideband filtering structure 20 and the narrowband filtering structure 30 are disposed in the dielectric body 10.

It should be noted that both the wideband filtering structure 20 and the narrowband filtering structure 30 can filter an input waveform before outputting.

A frequency band of an electromagnetic wave that can pass through the foregoing dielectric filter or through the foregoing filtering structures that have a filtering function is referred to as a passband.

On this basis, as shown in FIG. 3, the wideband filtering structure 20 includes a groove 201 and at least one first resonator 202.

The groove 201 is disposed on the first surface A1 of the dielectric body 10. The groove 201 may be formed by removing a part of the first surface A1 of the dielectric body 10.

The groove 201 is configured to adjust a frequency position of a passband of the wideband filtering structure 20. The frequency position of the passband of the wideband filtering structure 20 may be adjusted by adjusting a depth of the groove 201.

When the depth of the groove 201 is comparatively large, the frequency position of the passband of the wideband filtering structure 20 including the groove 201 is closer to a frequency with a comparatively large value. When the depth of the groove 201 is comparatively small, the frequency position of the passband of the wideband filtering structure 20 including the groove 201 is closer to a frequency with a comparatively small value.

The first resonator 202 includes a through hole 212 and an open loop 222.

The through hole 212 penetrates the bottom of the groove 201 and the second surface A2 of the dielectric body 10.

The open loop 222 is located on a bottom surface of the groove 201 and is disposed around an opening of the through hole 212.

It should be noted that the bottom surface and a side surface of the groove 201, and a hole wall surface of the through hole 212 are also covered with the conductive layer 11.

A position that is on the bottom surface of the groove 201 and where the open loop 222 is located is not covered with the conductive layer 11. In some embodiments of this application, the conductive layer 11 around an opening position at one end of the through hole 212 on the bottom surface of the groove 201 may be removed by using an etching process, to form the open loop 222, so that the one end of the through hole 212 on the bottom surface of the groove 201 and a part other than the open loop 222 on the bottom surface of the groove 201 form an open circuit.

One end of the through hole 212 on the second surface A2 of the dielectric body 10 is electrically connected to the conductive layer 11 on the second surface A2 by using the conductive layer 11 on the hole wall of the through hole 212, to form a short circuit.

In this case, the first resonator 202 may operate in a transverse electromagnetic wave (transverse electric and magnetic field, TEM) mode. That is, an electromagnetic wave in the first resonator 202 has no electric field component or magnetic field component in a propagation direction.

A harmonic suppression capability of the wideband filtering structure 20 may be adjusted by adjusting the depth of the groove 201 and a width of the open loop 202, so that the wideband filtering structure 20 has a good harmonic suppression capability. That is, a frequency F1 of a signal obtained after filtering performed by the wideband filtering structure 20 is within the passband of the wideband filtering structure 20. A harmonic at a position several times the frequency F1, for example, 1.5 times or 2 times the frequency F1, that is, a far-end harmonic, can be well suppressed. For example, the suppression capability may reach about 40 dB. Therefore, a harmonic suppression capability of the entire dielectric filter 01 is improved.

Setting of the depth of the groove 201 and the width of the open loop 202 may be related to setting of the passband of the wideband filtering structure 20. For example, in a case of a fixed passband of the wideband filtering structure 20, when the depth of the groove 201 is comparatively large, and the width of the open loop 202 is comparatively small, the wideband filtering structure 20 has a better far-end harmonic suppression capability. Therefore, in the case of the fixed passband of the wideband filtering structure 20, to improve the far-end harmonic suppression capability of the wideband filtering structure 20, the depth of the groove 201 may be appropriately increased, and the width of the open loop 202 may be appropriately reduced.

The narrowband filtering structure 30 includes at least one second resonator 301, and the second resonator 301 includes a blind hole disposed on the first surface A1 or the second surface A2 of the dielectric body 10. The blind hole is disposed parallel to the through hole 212.

A hole wall surface and a bottom surface of the blind hole are also covered with the conductive layer 11. A frequency position of a passband of the narrowband filtering structure 30 may be adjusted by adjusting a size of the blind hole, for example, a depth or a pore size.

When the depth of the blind hole is comparatively large, the frequency position of the passband of the narrowband filtering structure 30 including the blind hole is closer to a frequency with a comparatively small value. When the depth of the blind hole is comparatively small, the frequency position of the passband of the narrowband filtering structure 30 including the blind hole is closer to a frequency with a comparatively large value.

The narrowband filtering structure 30 and the wideband filtering structure 20 are located in the same dielectric body 10. The passband of the narrowband filtering structure 30 is within the passband of the wideband filtering structure 20. After a signal passes through the second resonator 301 in the narrowband filtering structure 30, a frequency is located near the passband, with a comparatively small range, of the narrowband filtering structure 30, thereby helping reduce a passband of the entire dielectric filter 01.

In conclusion, the dielectric filter 01 provided in this embodiment of this application includes the wideband filtering structure 20 and the narrowband filtering structure 30 that are disposed in the same dielectric body 10. The first resonator 202 in the wideband filtering structure 20 can enable a harmonic that is in an input signal and that is at a frequency position farther away from the passband of the dielectric filter 01, that is, a far-end harmonic, to be well suppressed. The second resonator 301 in the narrowband filtering structure 30 can limit a frequency of an output signal to a comparatively narrow passband.

After a signal passes through the dielectric filter 01, a far-end suppression capability can be improved for the signal, to reduce mutual interference between base stations of different frequency bands, and precision of frequency screening can also be improved for the signal, to avoid existence of an overlapping area in frequency bands of the base stations of different frequency bands.

The dielectric body 10 including the groove 201, the through hole 212, and the blind hole may be prepared by using an integrated molding process, and then a surface of the dielectric body 10 having the foregoing structure is electroplated by using an electroplating process. The dielectric body 10 is a continuous structure, which helps simplify a manufacturing process of the dielectric filter 01.

The wideband filtering structure 20 and the narrowband filtering structure 30 are disposed in the same dielectric body 10. Therefore, in a process of commissioning the dielectric filter 01, the wideband filtering structure 20 and the narrowband filtering structure 30 may be commissioned as a whole, or a commissioning process may be avoided, so that an echo of the dielectric filter 01 can reach a value that can meet a requirement, for example, 40 dB, thereby improving matching between the two filtering structures. Further, the following problem can be avoided: After a low-pass filter cascaded with the dielectric filter is added, the two filters cannot be commissioned as a whole. In addition, an amplitude and a phase of a signal filtered by the dielectric filter superimpose on an amplitude and a phase of the signal filtered by the cascaded low-pass filter respectively, where the dielectric filter and the cascaded low-pass filter are independent of each other. A great possibility of echo deterioration caused by the superimposition can be avoided.

In addition, because the wideband filtering structure 20 and the narrowband filtering structure 30 are disposed in the same dielectric body 10, the low-pass filter cascaded with the dielectric filter does not need to be disposed on a printed circuit board (PCB) on which the dielectric filter is disposed, or an extra PCB is added separately for disposing of the low-pass filter. Therefore, a problem of high layout space consumption can be resolved.

The following describes a specific structure of the dielectric filter 01 in detail by using examples.

Example 1

Figure 4:
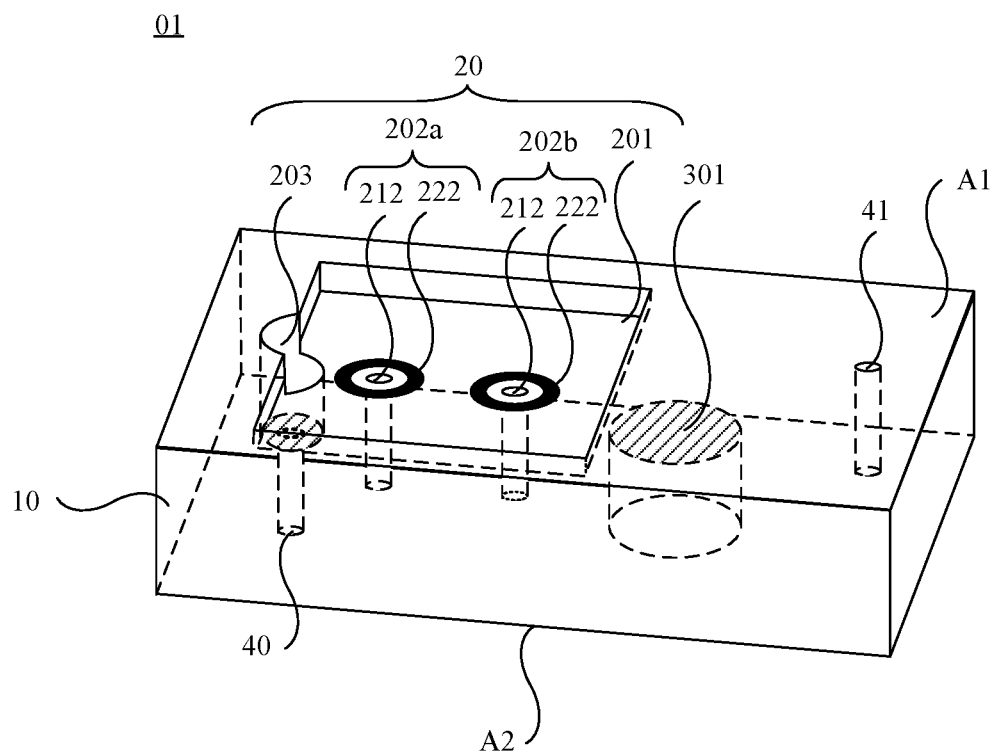
FIG. 4 is another schematic structural diagram of the transmitter filter or the receiver filter in FIG. 1.

In this example, to improve a filtering effect of the wideband filtering structure 20, as shown in FIG. 4, the wideband filtering structure 20 may include two first resonators, which are separately a first-order first resonator 202a and a second-order first resonator 202b that are coupled to each other.

The second-order first resonator 202b is located between the first-order first resonator 202a and the narrowband filtering structure 30, that is, the second filter 301.

It should be noted that the "first-order" and "second-order" before the "first resonator" in this application do not represent a sequence in which the first resonators perform signal filtering. For example, when a signal is input through the first-order first resonator 202a, the first-order first resonator 202a performs initial filtering on the signal, and then the second-order first resonator 202b performs second filtering on a signal obtained after the initial filtering. Alternatively, when a signal is input through the second-order first resonator 202b, the second-order first resonator 202b performs initial filtering on the signal, and then the first-order first resonator 202a performs second filtering on a signal obtained after the initial filtering.

In this case, a signal input to the wideband filtering structure 20 is subject to two-order frequency selection by using the first-order first resonator 202a and the second-order first resonator 202b sequentially, so that a frequency of a signal output by the wideband filtering structure 20 can be within the passband of the wideband filtering structure 20.

As shown in FIG. 4, the dielectric filter 01 may further include a first signal hole 40 and a second signal hole 41. The wideband filtering structure 20 and the narrowband filtering structure 30 are located between the first signal hole 40 and the second signal hole 41.

Figure 5:
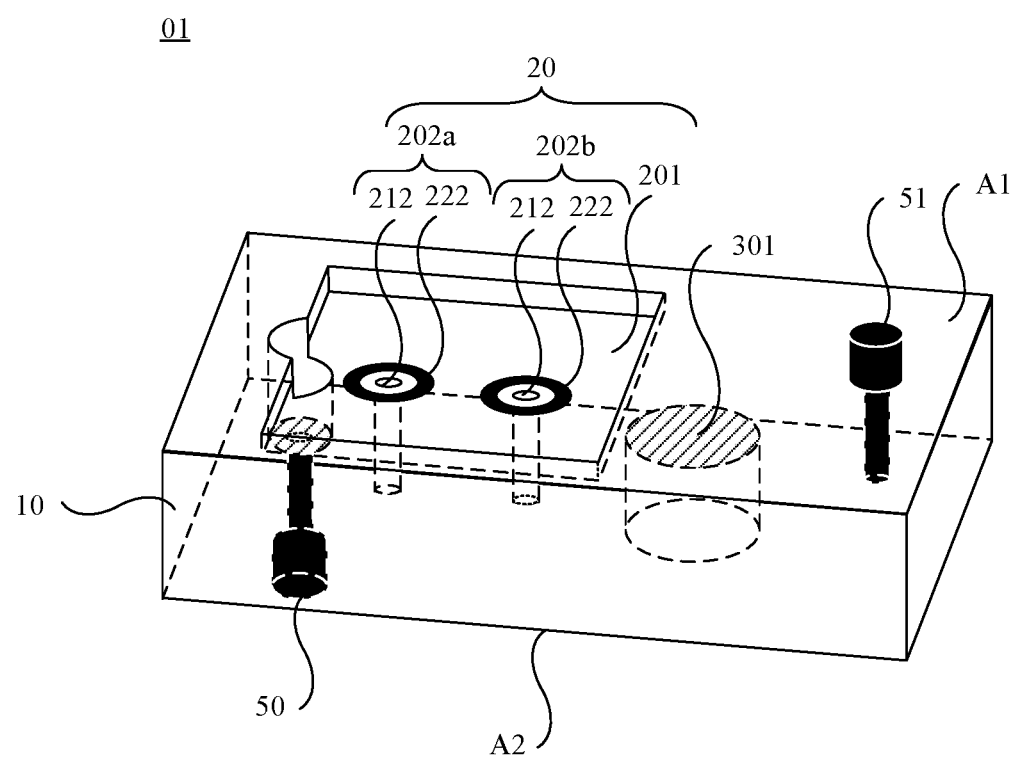
FIG. 5 is another schematic structural diagram of the transmitter filter or the receiver filter in FIG. 1.

As shown in FIG. 5, when a probe of an input connector 50 is inserted into the first signal hole 40, and a probe of an output connector 51 is inserted into the second signal hole 41, the first signal hole 40 is configured to receive a signal provided by the input connector 50, to implement signal input, and the second signal hole 41 is configured to output, to the output connector 51, a signal that is obtained after processing performed by the dielectric filter 01.

In this case, the first signal hole 40 is an input end of the dielectric filter 01, and the second signal hole 41 is an output end of the dielectric filter 01.

Alternatively, when the probe of the input connector 50 is inserted into the second signal hole 41, and the probe of the output connector 51 is inserted into the first signal hole 40, the second signal hole 41 is configured to receive a signal provided by the input connector 50, to implement signal input, and the first signal hole 40 is configured to output, to the output connector 51, a signal that is obtained after processing performed by the dielectric filter 01.

In this case, the second signal hole 41 is the input end of the dielectric filter 01, and the first signal hole 40 is the output end of the dielectric filter 01.

Figure 6:
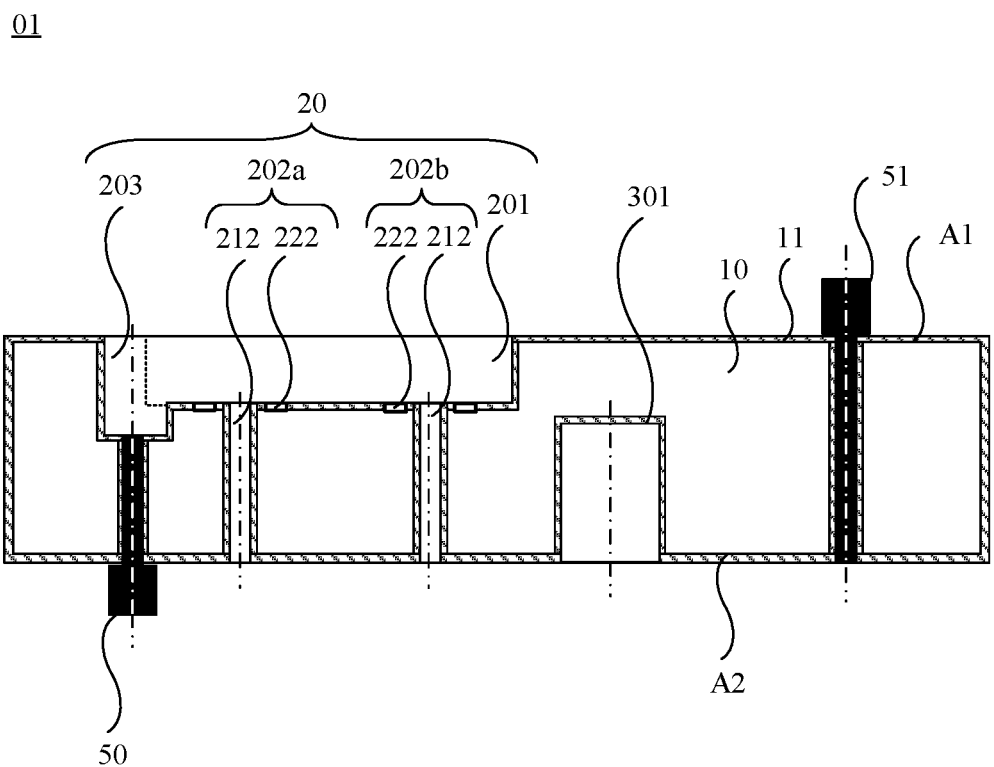
FIG. 6 is a longitudinal interface diagram of a dielectric filter shown in FIG. 5.

Optionally, in some embodiments of this application, as shown in FIG. 5 or FIG. 6 (FIG. 6 is a cross-sectional view of the dielectric filter 01), the input connector 50 and the output connector 51 may be separately disposed on different surfaces of the dielectric body 10. For example, the probe of the input connector 50 is inserted into the first signal hole 40 through the second surface A2 of the dielectric body 10, and the probe of the output connector 51 is inserted into the second signal hole 41 through the first surface A1 of the dielectric body 10.

Figure 7:
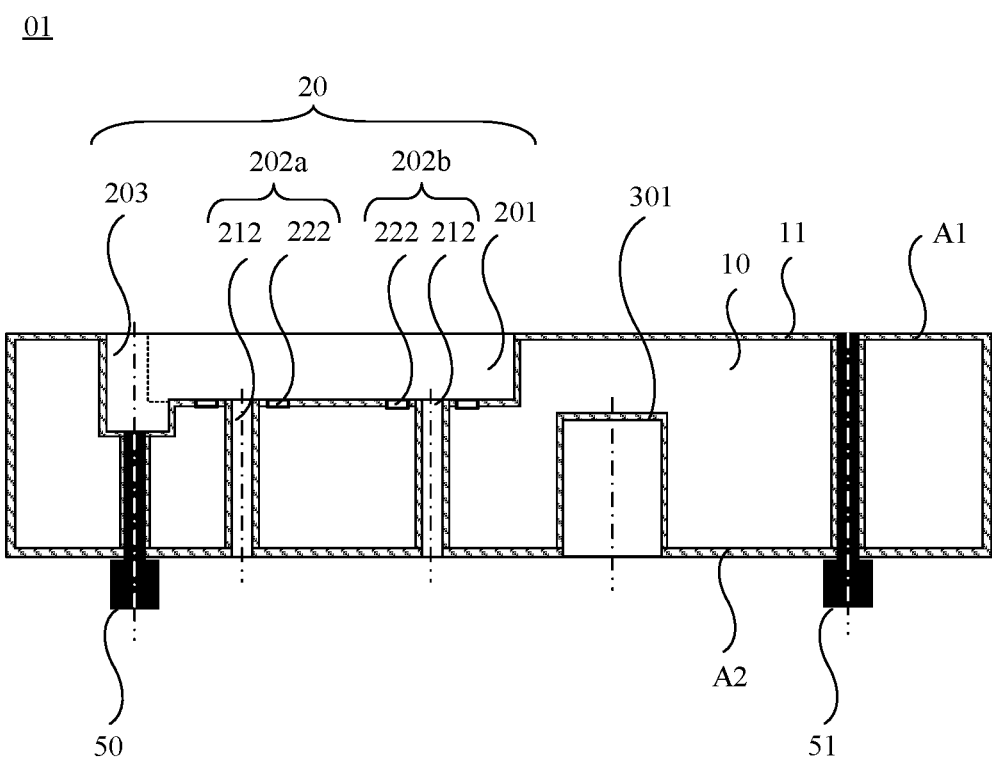
FIG. 7 is a longitudinal interface diagram of a dielectric filter according to some embodiments of this application.

Alternatively, in some other embodiments of this application, as shown in FIG. 7, the input connector 50 and the output connector 51 are disposed on a same surface of the dielectric body 10. For example, the probe of the input connector 50 is inserted into the first signal hole 40 through the second surface A2 of the dielectric body 10, and the probe of the output connector 51 is also inserted into the second signal hole 41 through the second surface A2 of the dielectric body 10.

Optionally, as shown in FIG. 4 or FIG. 6, the wideband filtering structure 20 further includes a third coupling blind hole 203. A hole wall and a bottom surface of the third coupling blind hole 203 are covered with the conductive layer 11. Optionally, the third coupling blind hole 203 is located on a side surface of the groove 201, penetrates the groove, and is connected to one end of the first signal hole 40.

A pore size of the third coupling blind hole 203 is greater than a pore size of the first signal hole 40. An amount of signal coupling between the first signal hole 40 and the wideband filtering structure 20 may be adjusted by adjusting a size of the third coupling blind hole 203, for example, the pore size or a hole depth.

When the pore size of the third coupling blind hole 203 is comparatively large, the amount of signal coupling between the first signal hole 40 and the wideband filtering structure 20 can be increased. When the pore size of the third coupling blind hole 203 is comparatively small, the amount of signal coupling between the first signal hole 40 and the wideband filtering structure 20 can be reduced.

Optionally, the hole depth of the third coupling blind hole 203 may also be adjusted. When the hole depth of the third coupling blind hole 203 is comparatively large, the amount of signal coupling between the first signal hole 40 and the wideband filtering structure 20 can be increased. When the hole depth of the third coupling blind hole 203 is comparatively small, the amount of signal coupling between the first signal hole 40 and the wideband filtering structure 20 can be reduced.

The following describes a working process of the dielectric filter 01 shown in FIG. 6.

For example, an example in which the first signal hole 40 is the input end of the dielectric filter 01, and the second signal hole 41 is the output end of the dielectric filter 01 is used.

The probe of the input connector 50 transmits a signal to the third coupling blind hole 203 through the first signal hole 40.

The third coupling blind hole 203 couples the signal to the first-order first resonator 202a. The first-order first resonator 202a performs initial filtering on the signal.

A signal obtained after the filtering performed by the first-order first resonator 202a is coupled to the second-order first resonator 202b. The second-order first resonator 202b performs second filtering on the signal.

In this case, the wideband resonant structure 20 completes filtering of the input signal. In this case, a frequency of a signal output by the wideband resonant structure 20 is within the passband of the wideband resonant structure 20. In addition, a far-end suppression capability for the signal output by the wideband resonant structure 20 can be controlled to be, for example, around 40 dB, to improve a filtering effect of the dielectric filter 01.

On this basis, a signal obtained after the filtering performed by the second-order first resonator 202b in the wideband resonant structure 20 is coupled to the second resonator 301 in the narrowband filtering structure 30. In this case, under an effect of filtering performed by the second resonator 301, a frequency of the signal output by the wideband resonant structure 20 can be limited to be near the passband of the narrowband filtering structure 30, to improve precision of frequency screening.

A signal obtained after filtering performed by the narrowband filtering structure 30 is output by the second signal hole 41 to the probe of the output connector 51. In this case, the dielectric filter 01 completes filtering work.

Alternatively, for another example, an example in which the second signal hole 41 is the input end of the dielectric filter 01, and the first signal hole 40 is the output end of the dielectric filter 01 is used.

The probe of the output connector 51 transmits a signal to the second resonator 301 in the narrowband filtering structure 30 through the second signal hole 41. In this case, under an effect of filtering performed by the second resonator 301, a frequency of the input signal can be limited to be near the passband of the narrowband filtering structure 30, to improve precision of frequency screening.

A signal obtained after filtering performed by the narrowband filtering structure 30 is coupled to the second-order first resonator 202b in the wideband resonant structure 20. The second-order first resonator 202b performs initial filtering on the signal.

A signal obtained after the filtering performed by the second-order first resonator 202b is coupled to the first-order first resonator 202a. The first-order first resonator 202b performs second filtering on the signal.

A signal obtained after the filtering performed by the second-order first resonator 202b is coupled to the third coupling blind hole 203, and then is transmitted to the probe of the input connector 50 through the third coupling blind hole 203 and the first signal hole 20. In this case, the dielectric filter 01 completes filtering work.

In this case, the wideband resonant structure 20 completes filtering of the input signal. In this case, because the signal passes through the narrowband filtering structure 30 first, a frequency of a signal output by the wideband resonant structure 20 is near the passband of the narrowband resonant structure 30. In addition, a far-end suppression capability for the signal output by the wideband resonant structure 20 can be controlled to be, for example, around 40 dB, to improve a filtering effect of the dielectric filter 01.

Example 2

Figure 8:
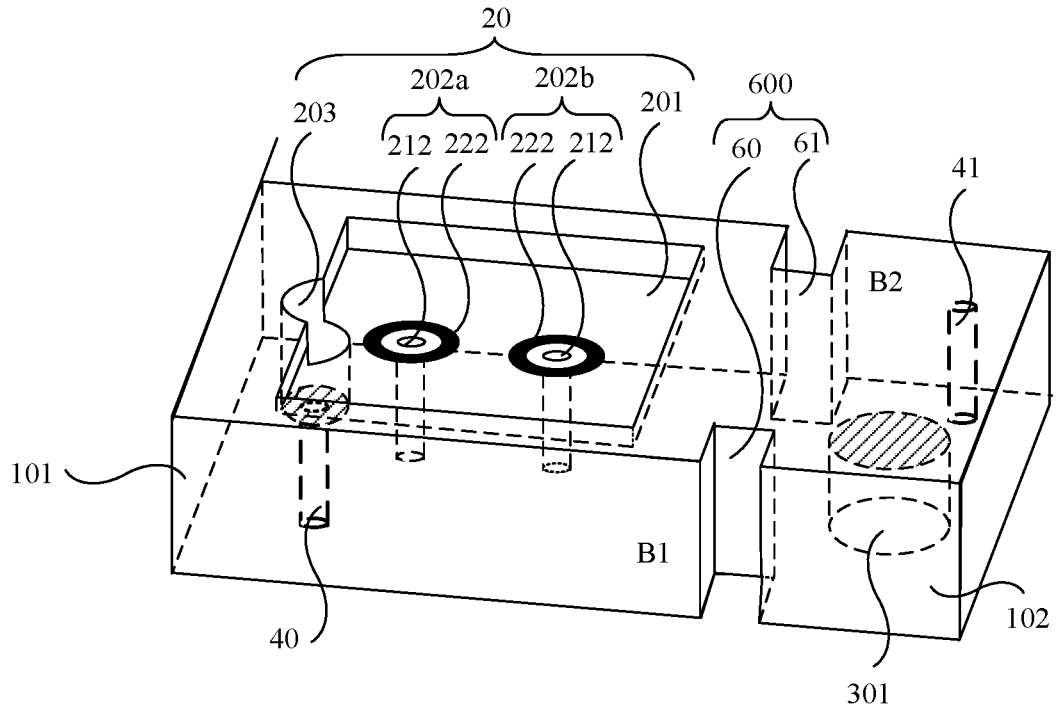
FIG. 8 is another schematic structural diagram of the transmitter filter or the receiver filter in FIG. 1.

In this example, as shown in FIG. 8, the dielectric body 10 includes a first dielectric block 101 and a second dielectric block 102 that are connected and are an integral structure, and a coupling adjustment structure 600 located between the first dielectric block 101 and the second dielectric block 102.

The coupling adjustment structure 600 is configured to adjust an amount of signal coupling between the first dielectric block 101 and the second dielectric block 102.

As shown in FIG. 8, when the dielectric body 10 has a first side surface B1 and a second side surface B2 that are disposed oppositely, the coupling adjustment structure 600 includes a first coupling blind hole 60 disposed on the first side surface B1, and a second coupling blind hole 61 disposed on the second side surface B2. Hole walls and bottom surfaces of the first coupling blind hole 60 and the second coupling blind hole 61 are covered with the conductive layer 11.

An orthographic projection of the first coupling blind hole 60 on the second side surface B2 overlaps at least a part of the second coupling blind hole 61. In this way, the first coupling blind hole 60 and the second coupling blind hole 61 can divide the dielectric body 10 into the first dielectric block 101 on the left and the second dielectric block 102 on the right.

It should be noted that, that the first dielectric block 101 and the second dielectric block 102 are connected and are the integral structure means that the dielectric body 10 including the first coupling blind hole 60 and the second coupling blind hole 61 may be prepared by using an integrated molding process, and then a surface of the dielectric body 10 having the foregoing structure is electroplated by using an electroplating process. The first dielectric block 101 and the second dielectric block 102 in the dielectric body 10 are a continuous structure.

In this example, as shown in FIG. 8, the wideband filtering structure 20 is disposed in the first dielectric block 101, and the at least one second resonator 301 in the narrowband filtering structure 30 is disposed in the second dielectric block 102.

In this case, a signal obtained after filtering performed by the first resonator 202 that is in the wideband filtering structure 20 and that is closest to the second dielectric block 102 may be coupled to the second resonator 301 in the second dielectric block 102 by using the coupling adjustment structure 600.

Alternatively, a signal obtained after filtering performed by the second resonator 301 in the second dielectric block 102 may be coupled, by using the coupling adjustment structure 600, to the first resonator 202 that is in the wideband filtering structure 20 in the first dielectric block 101 and that is closest to the second dielectric block 102.

As shown in FIG. 8, when the narrowband filtering structure 30 has only one second resonator 301, and the second resonator 301 is located in the second dielectric block 102, to enable signals of the wideband filtering structure 20 and the narrowband filtering structure 30 to be mutually coupled, a distance between the second resonator 301 and the first resonator 202 that is in the wideband filtering structure 20 and that is closest to the second dielectric block 102 may be shortened.

When depths of the first coupling blind hole 60 and the second coupling blind hole 61 are larger, that is, a distance between the bottom surfaces of the first coupling blind hole 60 and the second coupling blind hole 61 is smaller, a smaller amount of signal coupling exists between the second resonator 301 in the second dielectric block 102 and the first resonator 202 that is in the wideband filtering structure 20 and that is closest to the second dielectric block 102.

When the depths of the first coupling blind hole 60 and the second coupling blind hole 61 are smaller, that is, the distance between the bottom surfaces of the first coupling blind hole 60 and the second coupling blind hole 61 is larger, a larger amount of signal coupling exists between the second resonator 301 in the second dielectric block 102 and the first resonator 202 that is in the wideband filtering structure 20 and that is closest to the second dielectric block 102.

In this example, a filtering process of the dielectric filter 01 is the same as that described above, and details are not described herein again.

Example 3

Figure 9:
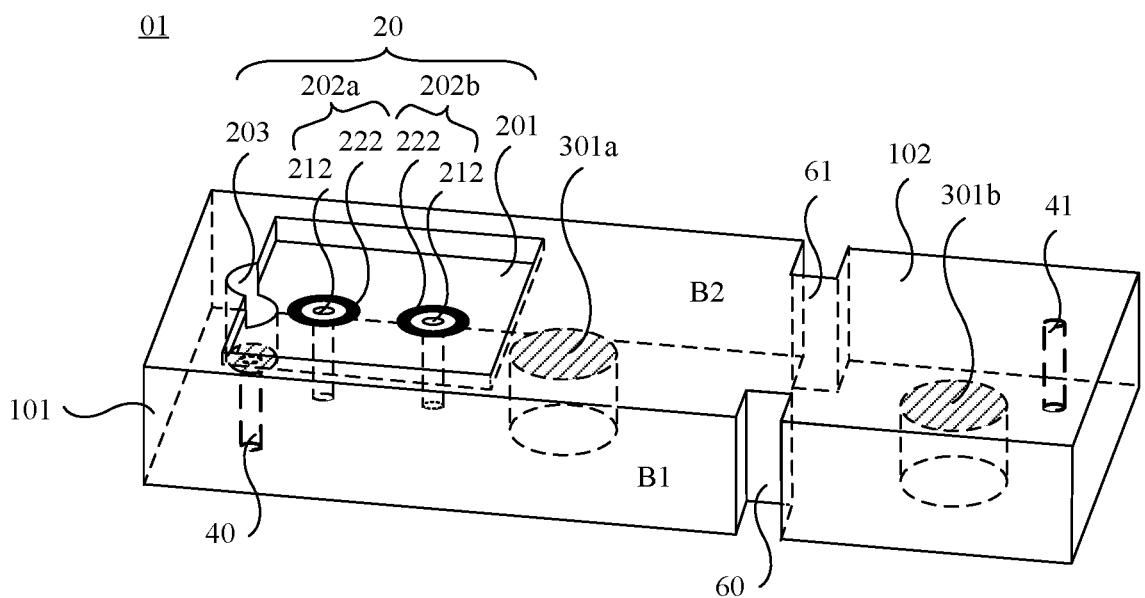
FIG. 9 is another schematic structural diagram of the transmitter filter or the receiver filter in FIG. 1.

In this example, as shown in FIG. 9, the dielectric body 10 is still divided into the first dielectric block 101 and the second dielectric block 102 by using the first coupling blind hole 60 and the second coupling blind hole 61.

Different from the narrowband filtering structure 30 in Example 2, in Example 3, the narrowband filtering structure 30 includes two second resonators: a first-order second resonator 301a and a second-order second resonator 301b that are coupled to each other, as shown in FIG. 9.

The first-order second resonator 301a and the wideband filtering structure 20 are located in the first dielectric block 101, and the first-order second resonator 301a is located on a side that is of the wideband filtering structure 20 and that is close to the second dielectric block 102.

The second-order second resonator 301b is located in the second dielectric block 102.

Figure 10:
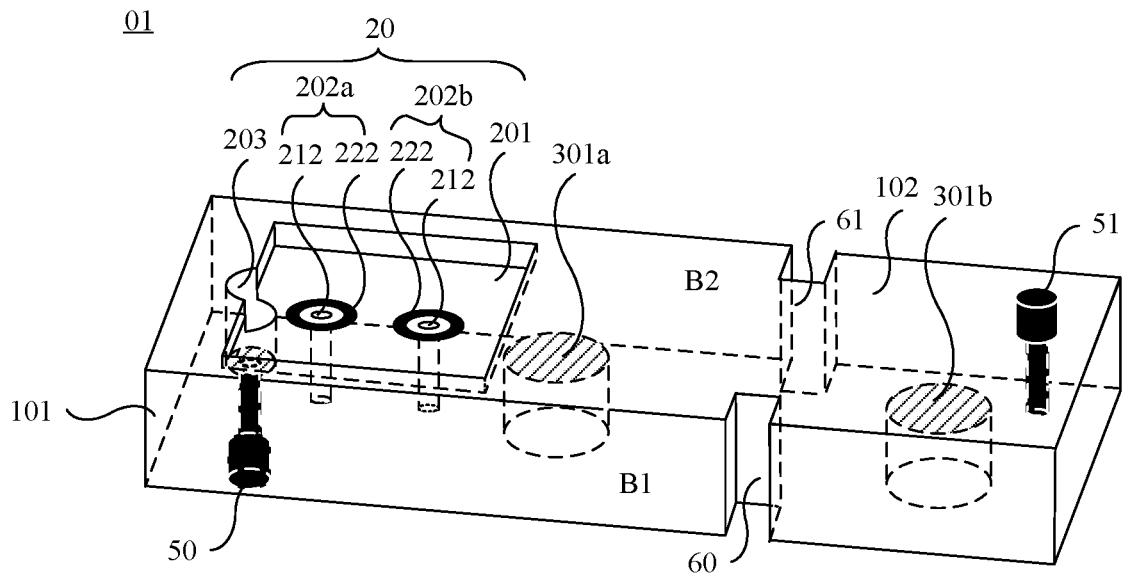
FIG. 10 is another schematic structural diagram of the transmitter filter or the receiver filter in FIG. 1.

As shown in FIG. 10, when the first signal hole 40 is the input end of the dielectric filter 01, and the second signal hole 41 is the output end of the dielectric filter 01, a filtering process of the dielectric filter 01 shown in FIG. 10 is described in the following.

The probe of the input connector 50 transmits a signal to the third coupling blind hole 203 through the first signal hole 40.

The third coupling blind hole 203 couples the signal to the first-order first resonator 202a. The first-order first resonator 202a performs initial filtering on the signal.

A signal obtained after the filtering performed by the first-order first resonator 202a is coupled to the second-order first resonator 202b. The second-order first resonator 202b performs second filtering on the signal.

In this case, the wideband resonant structure 20 completes filtering of the input signal. In this case, a frequency of a signal output by the wideband resonant structure 20 is within the passband of the wideband resonant structure 20. A far-end suppression capability for the signal output by the wideband resonant structure 20 can be controlled to be, for example, around 40 dB, to improve a filtering effect of the dielectric filter 01. On this basis, a signal obtained after the filtering performed by the second-order first resonator 202b in the wideband resonant structure 20 is coupled to the first-order second resonator 301a in the narrowband filtering structure 30. In this case, the first-order second resonator 301a performs third filtering on the signal output by the second-order first resonator 202b in the wideband resonant structure 20.

A signal obtained after the filtering performed by the second-order first resonator 202b is coupled to the second-order second resonator 301b in the second dielectric block 102 by using the coupling adjustment structure 600. The second-order second resonator 301b may perform fourth filtering on the signal.

Under effects of the filtering performed by the first-order second resonator 301a and the filtering performed by the second-order second resonator 301b in the narrowband filtering structure 30, the frequency of the signal output by the wideband resonant structure 20 can be limited to be near the passband of the narrowband filtering structure 30, to improve precision of frequency screening.

A signal obtained after filtering performed by the narrowband filtering structure 30 is output by the second signal hole 41 to the probe of the output connector 51. In this case, the dielectric filter 01 completes filtering work.

It should be noted that the "first-order" and "second-order" before the "second resonator" in this application do not represent a sequence in which the second resonators perform signal filtering. For example, the foregoing description is provided by using an example in which relative to the second-order second resonator 301b, the first-order second resonator 301a performs filtering first when a signal is input through the first-order second resonator 301a.

Alternatively, when the second signal hole 41 is the input end of the dielectric filter 01, and the first signal hole 40 is the output end of the dielectric filter 01, a signal is input through the second-order second resonator 301b. In this case, the second-order second resonator 301b performs initial filtering on the signal input by the probe of the input connector 50 through the second signal hole 41. Then, a signal obtained after the initial filtering is coupled to the first-order second resonator 301a in the first dielectric block 102 through the coupling adjustment structure 600. The first-order second resonator 301a performs second filtering on the signal. A process in which the second-order first resonator 202b and the first-order first resonator 202a in the wideband filtering structure 30 sequentially filter the foregoing signal is the same as that in Example 1, and details are not described herein again.

Adjustment of an amount of signal coupling between the first-order second resonator 301a and the second-order second resonator 301b by adjusting the hole depths of the first coupling blind hole 60 and the second coupling blind hole 61 in the coupling adjustment structure 600 is the same as that in the foregoing description, and details are not described herein again.

Figure 11A:
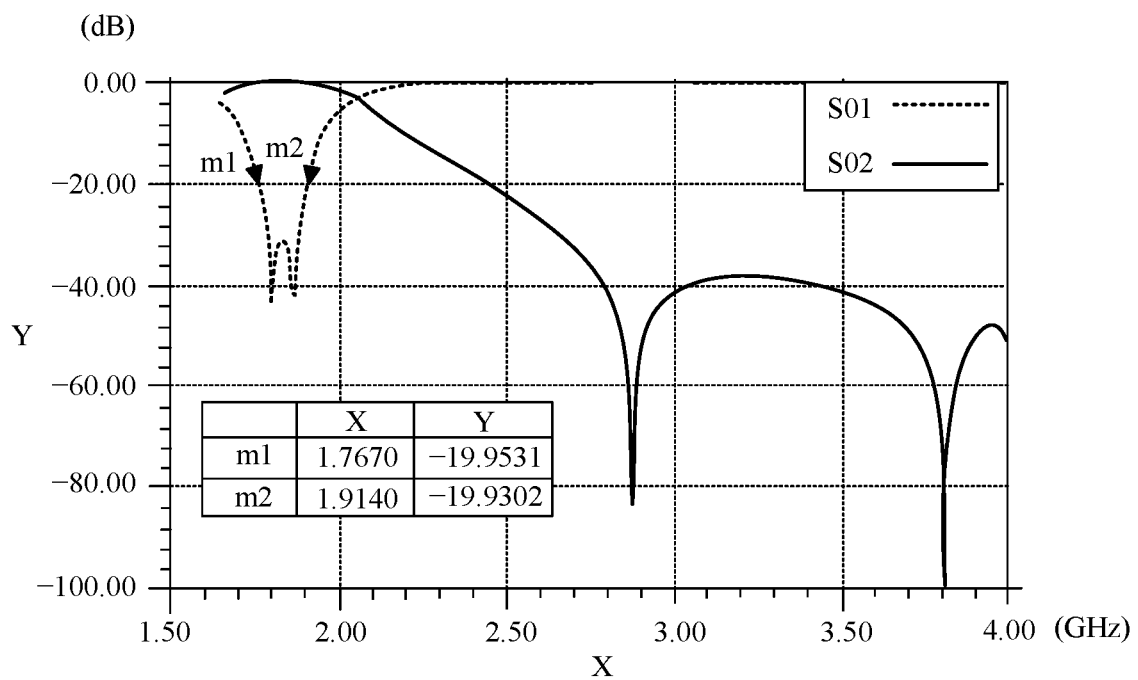
FIG. 11a is a frequency response curve diagram of a dielectric filter according to some embodiments of this application.

For example, when the wideband resonant structure 20 alone is used as a dielectric filter, it can be learned from an echo curve S01 and a frequency response curve S02 of the wideband resonant structure 20 that a passband of the wideband resonant structure 20 is 1.7670 GHz to 1.9140 GHz, as shown in FIG. 11a. In addition, a harmonic suppression capability of the wideband resonant structure 20 at a far end (3 GHz to 4 GHz) is around 40 dBF.

Figure 11B:
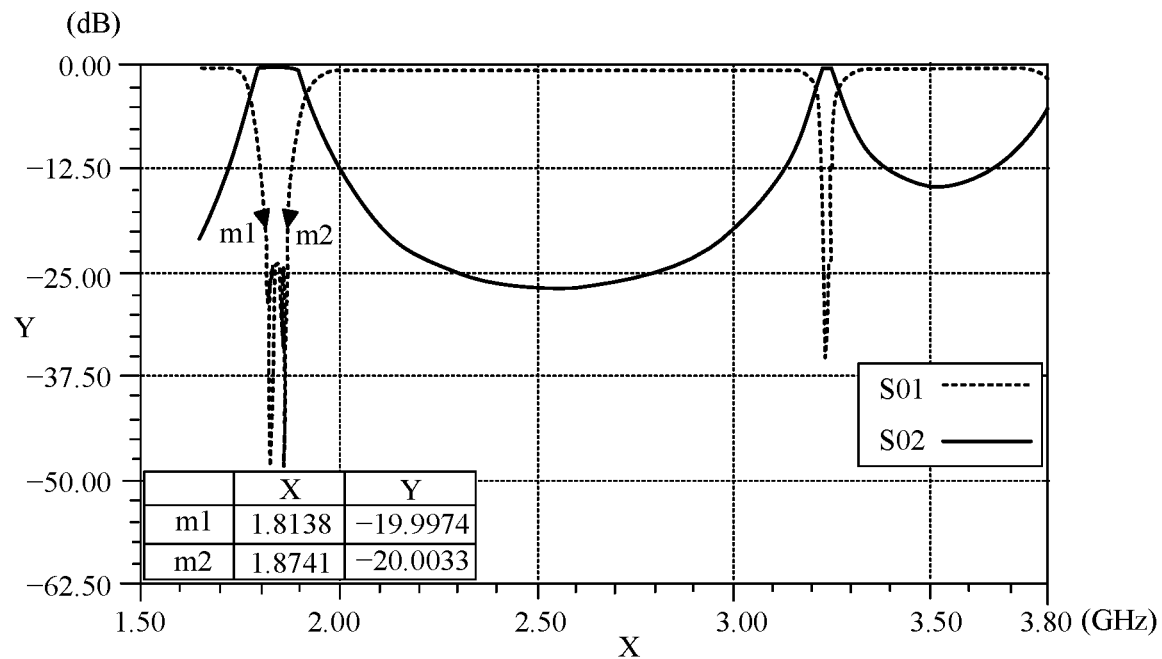
FIG. 11b is a frequency response curve diagram of another dielectric filter according to some embodiments of this application.

When the narrowband resonant structure 30 alone is used as a dielectric filter, it can be learned from an echo curve S01 and a frequency response curve S02 of the narrowband resonant structure 30 that a passband of the narrowband resonant structure 30 is 1.8138 GHz to 1.8741 GHz, as shown in FIG. 11b. A harmonic suppression capability of the narrowband resonant structure 30 at the far end (3 GHz to 4 GHz) is poorer and is around 12 dB.

Figure 11C:
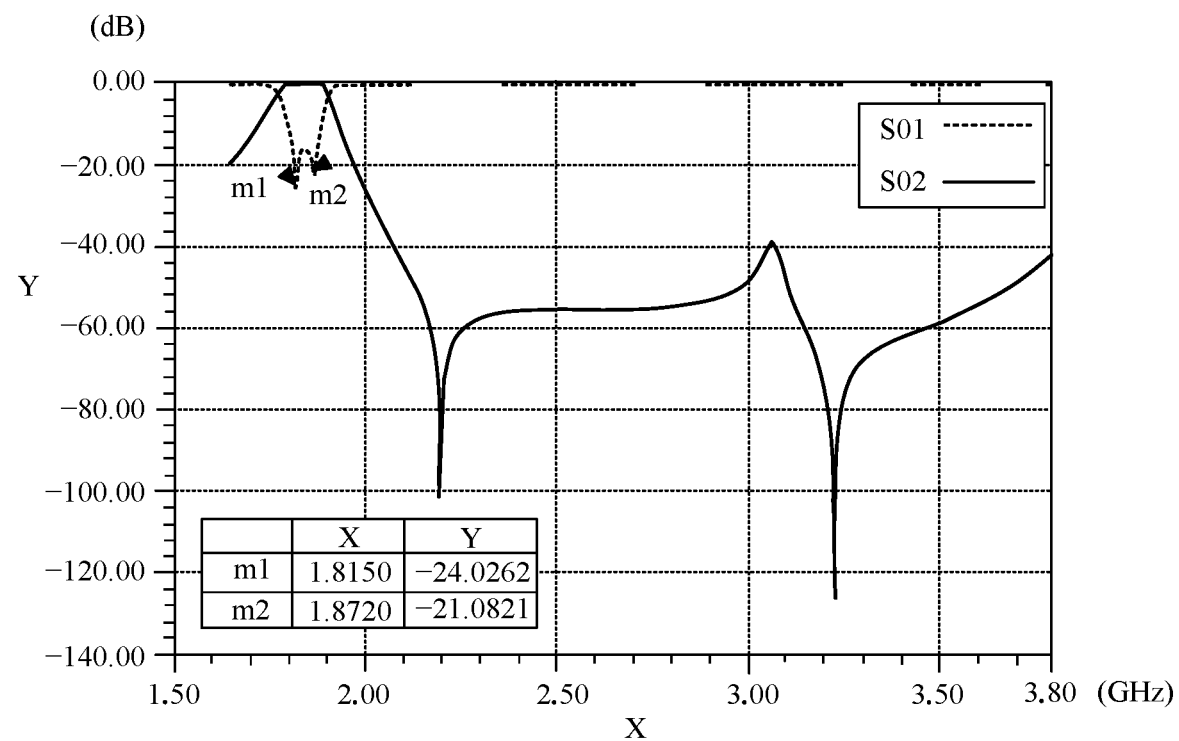
FIG. 11c is a frequency response curve diagram of another dielectric filter according to some embodiments of this application.

In the dielectric filter 01 provided in this embodiment of the present invention, the wideband resonant structure 20 and the narrowband resonant structure 30 are integrated into the same dielectric body 10. In this way, it can be learned from an echo curve S01 and a frequency response curve S02 of the narrowband resonant structure 30 in FIG. 11c that, under an effect of filtering performed by the wideband resonant structure 20, a harmonic suppression capability of the dielectric filter 01 at the far end (3 GHz to 4 GHz) is better and is around 40 dBF.

Under an effect of filtering performed by the narrowband resonant structure 30, a frequency of a signal output by the dielectric filter 01 can be limited to a range of 1.8150 GHz to 1.8720 GHz, that is, around the passband (1.8138 GHz to 1.8741 GHz) of the narrowband filtering structure 30.

Figure 12:
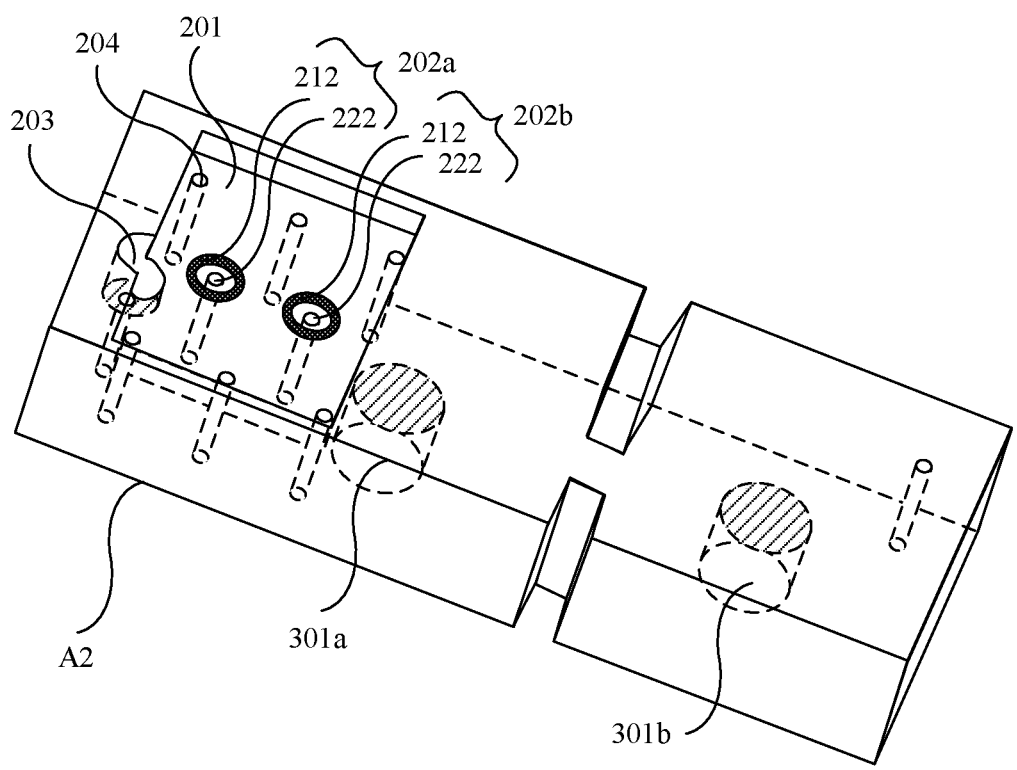
FIG. 12 is another schematic structural diagram of the transmitter filter or the receiver filter in FIG. 1.

On this basis, in the structure in any one of the foregoing examples, the wideband filtering structure 20 further includes at least one adjustment through hole 204, as shown in FIG. 12. A hole wall of the adjustment through hole 204 is covered with the conductive layer 11.

The adjustment through hole 204 penetrates the bottom of the groove 201 and the second surface A2 of the dielectric body 10. The adjustment through hole 204 is configured to adjust the harmonic suppression capability of the dielectric filter 01.

Density of a plurality of adjustment through holes 204 is proportional to the harmonic suppression capability of the dielectric filter 01. That is, larger density of the plurality of adjustment through holes 204 indicates a stronger harmonic suppression capability of the dielectric filter 01.

On this basis, to simplify a manufacturing process and facilitate arrangement of the plurality of adjustment through holes 204, as shown in FIG. 12, the plurality of adjustment through holes 204 are arranged in a matrix form, and are evenly distributed at a position where the groove 201 is located.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A dielectric filter comprising:
a dielectric body, wherein a surface of the dielectric body is covered with a conductive layer;
a wideband filtering structure comprising a groove and at least one first resonator, wherein:
the groove is disposed on a first surface of the dielectric body and is configured to adjust a frequency position of the passband of the wideband filtering structure;
the first resonator comprises a through hole and an open loop, the through hole penetrates the bottom of the groove and a second surface of the dielectric body, and a hole wall of the through hole is covered with the conductive layer;
the open loop is located on a bottom surface of the groove and is disposed around an opening of the through hole; and
a side surface of the groove and a part, other than the open loop, of the bottom surface of the groove are covered with the conductive layer;
a narrowband filtering structure comprising at least one second resonator, which comprises a blind hole disposed on the first surface or the second surface of the dielectric body, wherein a hole wall and a bottom surface of the blind hole are covered with the conductive layer; and the first surface and the second surface of the dielectric body are disposed oppositely;
wherein both the wideband filtering structure and the narrowband filtering structure are disposed in the dielectric body; a passband of the narrowband filtering structure is located within a passband of the wideband filter structure.

2. The dielectric filter according to claim 1, wherein the dielectric body comprises a first dielectric block and a second dielectric block that are connected and are an integral structure, and a coupling adjustment structure is located between the first dielectric block and the second dielectric block, wherein:
the coupling adjustment structure is configured to adjust an amount of signal coupling between the first dielectric block and the second dielectric block; and
the wideband filtering structure is disposed in the first dielectric block, and the at least one second resonator in the narrowband filtering structure is disposed in the second dielectric block.

3. The dielectric filter according to claim 2, wherein the dielectric body comprises a first side surface and a second side surface that are disposed oppositely;
the coupling adjustment structure comprises a first coupling blind hole disposed on the first side surface, and a second coupling blind hole disposed on the second side surface, wherein an orthographic projection of the first coupling blind hole on the second side surface overlaps at least a part of the second coupling blind hole; and
hole walls and bottom surfaces of the first coupling blind hole and the second coupling blind hole are covered with the conductive layer.

4. The dielectric filter according to claim 1, wherein the dielectric body comprises a first dielectric block and a second dielectric block that are connected and are an integral structure, and a coupling adjustment structure is located between the first dielectric block and the second dielectric block, wherein:
the coupling adjustment structure is configured to adjust an amount of signal coupling between the first dielectric block and the second dielectric block;
the narrowband filtering structure, wherein the at least one second resonator comprises two second resonators, which are separately a first-order second resonator and a second-order second resonator that are coupled to each other;
the first-order second resonator and the wideband filtering structure are located in the first dielectric block, and the first-order second resonator is located on a side that is of the wideband filtering structure and that is close to the second dielectric block; and
the second-order second resonator is located in the second dielectric block.

5. The dielectric filter according to claim 1, wherein the at least one first resonator of the wideband filtering structure comprises two first resonators, which are separately a first-order first resonator and a second-order first resonator that are coupled to each other, wherein:
the second-order first resonator is located between the first-order first resonator and the narrowband filtering structure.

6. The dielectric filter according to claim 1, wherein the wideband filtering structure further comprises at least one adjustment through hole, wherein a hole wall of the adjustment through hole is covered with the conductive layer; and
the adjustment through hole penetrates the bottom of the groove and the second surface of the dielectric body, and the adjustment through hole is configured to adjust a harmonic suppression capability of the dielectric filter.

7. The dielectric filter according to claim 6, wherein a plurality of adjustment through holes are arranged in a matrix form, and are evenly distributed at a position where the groove is located.

8. The dielectric filter according to claim 1, wherein the wideband filtering structure further comprises a first signal hole and a second signal hole, wherein:
the first signal hole is configured to input a signal, and the second signal hole is configured to output a signal; or the second signal hole is configured to input a signal, and the first signal hole is configured to output a signal; and
the wideband filtering structure and the narrowband filtering structure are located between the first signal hole and the second signal hole.

9. The dielectric filter according to claim 8, wherein the wideband filtering structure further comprises a third coupling blind hole, wherein a hole wall and a bottom surface of the third coupling blind hole are covered with the conductive layer;
the third coupling blind hole is located on a side surface of the groove, penetrates the groove, and is connected to one end of the first signal hole; and a pore size of the third coupling blind hole is greater than a pore size of the first signal hole, and the third coupling blind hole is configured to adjust an amount of signal coupling between the first signal hole and the wideband filtering structure.

10. A duplexer, comprising a transmitter filter and a receiver filter, wherein
at least one of the transmitter filter or the receiver filter is a dielectric filter comprising:
a dielectric body, wherein a surface of the dielectric body is covered with a conductive layer;
a wideband filtering structure comprising a groove and at least one first resonator, wherein:
the groove is disposed on a first surface of the dielectric body and is configured to adjust a frequency position of the passband of the wideband filtering structure;
the first resonator comprises a through hole and an open loop, the through hole penetrates the bottom of the groove and a second surface of the dielectric body, and a hole wall of the through hole is covered with the conductive layer;
the open loop is located on a bottom surface of the groove and is disposed around an opening of the through hole; and
a side surface of the groove and a part, other than the open loop, of the bottom surface of the groove are covered with the conductive layer;
a narrowband filtering structure comprising at least one second resonator, which comprises a blind hole disposed on the first surface or the second surface of the dielectric body, wherein a hole wall and a bottom surface of the blind hole are covered with the conductive layer; and the first surface and the second surface of the dielectric body are disposed oppositely;
wherein both the wideband filtering structure and the narrowband filtering structure are disposed in the dielectric body; a passband of the narrowband filtering structure is located within a passband of the wideband filter structure.

11. The duplexer according to claim 10, wherein the dielectric body comprises a first dielectric block and a second dielectric block that are connected and are an integral structure, and a coupling adjustment structure is located between the first dielectric block and the second dielectric block, wherein:
the coupling adjustment structure is configured to adjust an amount of signal coupling between the first dielectric block and the second dielectric block; and
the wideband filtering structure is disposed in the first dielectric block, and the at least one second resonator in the narrowband filtering structure is disposed in the second dielectric block.

12. The duplexer according to claim 11, wherein the dielectric body comprises a first side surface and a second side surface that are disposed oppositely;
the coupling adjustment structure comprises a first coupling blind hole disposed on the first side surface, and a second coupling blind hole disposed on the second side surface, wherein an orthographic projection of the first coupling blind hole on the second side surface overlaps at least a part of the second coupling blind hole; and
hole walls and bottom surfaces of the first coupling blind hole and the second coupling blind hole are covered with the conductive layer.

13. The duplexer according to claim 10, wherein the dielectric body comprises a first dielectric block and a second dielectric block that are connected and are an integral structure, and a coupling adjustment structure is located between the first dielectric block and the second dielectric block, wherein:
the coupling adjustment structure is configured to adjust an amount of signal coupling between the first dielectric block and the second dielectric block;
the narrowband filtering structure, wherein the at least one second resonator comprises two second resonators, which are separately a first-order second resonator and a second-order second resonator that are coupled to each other;
the first-order second resonator and the wideband filtering structure are located in the first dielectric block, and the first-order second resonator is located on a side that is of the wideband filtering structure and that is close to the second dielectric block; and
the second-order second resonator is located in the second dielectric block.

14. The duplexer according to claim 10, wherein the at least one first resonator of the wideband filtering structure comprises two first resonators, which are separately a first-order first resonator and a second-order first resonator that are coupled to each other, wherein:
the second-order first resonator is located between the first-order first resonator and the narrowband filtering structure.

15. The duplexer according to claim 10, wherein the wideband filtering structure further comprises at least one adjustment through hole, wherein a hole wall of the adjustment through hole is covered with the conductive layer; and
the adjustment through hole penetrates the bottom of the groove and the second surface of the dielectric body, and the adjustment through hole is configured to adjust a harmonic suppression capability of the dielectric filter.

16. A communications device, comprising a duplexer which comprises a transmitter filter and a receiver filter, wherein at least one of the transmitter filter or the receiver filter is a dielectric filter comprising:
a dielectric body, wherein a surface of the dielectric body is covered with a conductive layer;
a wideband filtering structure comprising a groove and at least one first resonator, wherein:
the groove is disposed on a first surface of the dielectric body and is configured to adjust a frequency position of the passband of the wideband filtering structure;
the first resonator comprises a through hole and an open loop, the through hole penetrates the bottom of the groove and a second surface of the dielectric body, and a hole wall of the through hole is covered with the conductive layer;
the open loop is located on a bottom surface of the groove and is disposed around an opening of the through hole; and
a side surface of the groove and a part, other than the open loop, of the bottom surface of the groove are covered with the conductive layer;
a narrowband filtering structure comprising at least one second resonator, which comprises a blind hole disposed on the first surface or the second surface of the dielectric body, wherein a hole wall and a bottom surface of the blind hole are covered with the conductive layer; and the first surface and the second surface of the dielectric body are disposed oppositely;
wherein both the wideband filtering structure and the narrowband filtering structure are disposed in the dielectric body; a passband of the narrowband filtering structure is located within a passband of the wideband filter structure.

17. The communications device according to claim 16, wherein the dielectric body comprises a first dielectric block and a second dielectric block that are connected and are an integral structure, and a coupling adjustment structure is located between the first dielectric block and the second dielectric block, wherein:
the coupling adjustment structure is configured to adjust an amount of signal coupling between the first dielectric block and the second dielectric block; and
the wideband filtering structure is disposed in the first dielectric block, and the at least one second resonator in the narrowband filtering structure is disposed in the second dielectric block.

18. The communications device according to claim 17, wherein the dielectric body comprises a first side surface and a second side surface that are disposed oppositely;
the coupling adjustment structure comprises a first coupling blind hole disposed on the first side surface, and a second coupling blind hole disposed on the second side surface, wherein an orthographic projection of the first coupling blind hole on the second side surface overlaps at least a part of the second coupling blind hole; and
hole walls and bottom surfaces of the first coupling blind hole and the second coupling blind hole are covered with the conductive layer.

19. The communications device according to claim 16, wherein the dielectric body comprises a first dielectric block and a second dielectric block that are connected and are an integral structure, and a coupling adjustment structure is located between the first dielectric block and the second dielectric block, wherein:
the coupling adjustment structure is configured to adjust an amount of signal coupling between the first dielectric block and the second dielectric block;
the narrowband filtering structure, wherein the at least one second resonator comprises two second resonators, which are separately a first-order second resonator and a second-order second resonator that are coupled to each other;
the first-order second resonator and the wideband filtering structure are located in the first dielectric block, and the first-order second resonator is located on a side that is of the wideband filtering structure and that is close to the second dielectric block; and
the second-order second resonator is located in the second dielectric block.

20. The communications device according to claim 16, wherein the at least one first resonator of the wideband filtering structure comprises two first resonators, which are separately a first-order first resonator and a second-order first resonator that are coupled to each other, wherein:
the second-order first resonator is located between the first-order first resonator and the narrowband filtering structure.

* * * * *